United States Patent [19]

Kubota et al.

[11] Patent Number: 4,525,421

[45] Date of Patent: Jun. 25, 1985

[54] SURFACE HARD COAT FOR A SYNTHETIC RESIN LENS

[75] Inventors: Satoshi Kubota; Mikito Nakashima; Takao Mogami; Tetsuo Nakagawa, all of Suwa, Japan

[73] Assignee: Kabushiki Kaisha Suwa Seikosha, Tokyo, Japan

[21] Appl. No.: 619,890

[22] Filed: Jun. 12, 1984

[30] Foreign Application Priority Data

Jun. 14, 1983 [JP] Japan ................. 58-106092

[51] Int. Cl.³ .............................. B32B 27/36
[52] U.S. Cl. ..................... 428/412; 428/413; 523/435; 523/466; 524/847; 524/852; 524/868
[58] Field of Search ............ 523/212, 435, 466; 524/847, 852, 868; 428/412, 413

[56] References Cited

U.S. PATENT DOCUMENTS

| | | | |
|---|---|---|---|
| 4,241,116 | 12/1980 | Taniyama et al. | 428/412 |
| 4,311,762 | 1/1982 | Spycher et al. | 428/412 |
| 4,343,857 | 8/1982 | Uram | 428/413 |
| 4,425,403 | 1/1984 | Taniguchi et al. | 428/412 |

*Primary Examiner*—Lewis T. Jacobs
*Attorney, Agent, or Firm*—Blum Kaplan Friedman Silberman & Beran

[57] ABSTRACT

A surface hard coating composition for a synthetic resin lens including:

(A) at least one organic silicon compound represented by the general formula

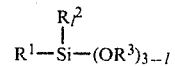

wherein $R^1$ is a hydrocarbon group having from one to six carbon atoms or an organic group including vinyl, methacryloyloxy or an epoxy radical, $R^2$ is a hydrocarbon group having from one to four carbon atoms, $R^3$ is a hydrocarbon or alkoxy alkyl group having from one to five carbon atoms or a hydrogen atom and l is 0 or one;

(B) colloidal silica;
(C) at least one poly functional epoxy compound; and
(D) magnesium perchlorate.

11 Claims, No Drawings

SURFACE HARD COAT FOR A SYNTHETIC RESIN LENS

BACKGROUND OF THE INVENTION

This invention relates generally to a surface hard coat for a synthetic resin lens, and more particularly to a hard coat including organic silane compounds, colloidal silica, epoxy compounds and magnesium perchlorate as a curing catalyst for providing improved abrasion resistance, hot water resistance, tintability by disperse dyes, chemicals resistance and weatherability.

A synthetic resin lens has many advantages compared to an inorganic glass lens. For example, the synthetic lens is lighter than an inorganic glass lens and provides excellent impact resistance and superior processing characteristics. On the other hand, the synthetic resin lens does have some disadvantages. Specifically, the synthetic resin lens scratches or scars easily and is affected easily by an organic solvent.

In order to overcome these disadvantages, it has been proposed to coat the synthetic resin lens with various types of hardening resins. To date, the coated synthetic resin lens has not satisfied all of the necessary requirements of a suitable lens. One such coating composition includes a combination of a hydrolyzed trifunctional silane, such as methytrialkoxysilane and a hydrolyzed tetra-functional silane, such as tetramethylsilicate and tetraethyl silicate. This coating composition has not satisfied all of the desired characteristics with respect to abrasion resistance, tintability by disperse dyes, shelf life, and the like.

It is also known that a Lewis acid or a complex thereof, Bronsted acids or metal salts of carboxylic acid can be used as a curing catalyst for an alkoxysilane including an epoxy group. However, the shelf life of such a composition containing this type of catalyst is short. Additionally, the curing takes an extended period of time. Therefore, such catalysts are not practical.

An additional coating composition for synthetic resin lenses include at least one or a mixture selected from the group of compounds including one or both of an epoxy group, silanol and/or siloxane group and fine particles of silica having a diameter between 1 to 100 millimicrons and an aluminum chelate compound as described in U.S. Pat. No. 4,211,823. Such cured coating compositions are not completely satisfactory in that sufficient hardness is not achieved and it is lowered by dipping in hot water. Additionally, the shelf life is also short.

In a synthetic resin lens, particularly one to be used for a spectacle, it is desirable that the surface coating be dyeable easily. Therefore, not only is abrasion resistance important, but also unchanged tintability over an extended shelf life is very important. Up to the present time, the following coating compositions have been utilized for this purpose. This composition includes (a) ammonium perchlorate and (b) one or more compounds selected from hydrolyzed alkoxysilanes including an epoxy group or hydrolyzed alkoxysilanes including a vinyl group, a methacryloyloxy group, amino group, a mercapto group or chlorine and (c) colloidal silica having a particle diameter of 1 to 100 μm or an organic titanium compound. Another coating composition includes (a) one or more polymers or copolymers obtained by polymerization or copolymerization of an organosilicon compound including a vinyl group, a methacryloyloxy group, an amino group, a mercapto group or chlorine, hydrolyzed compounds thereof, and an epoxy compound and a vinyl monomer including at least one epoxy group in the monomeric unit; (b) a colloidal silica having a particle size diameter between 1 to 100 μm; and (c) ammonium perchlorate. This latter coating composition is not entirely satisfactory in view of the limited abrasion resistance and tintability by a disperse dye. Further, the tintability by a disperse dye varies over the shelf life. Thus, these latter types of coating compositions are not entirely practical.

Accordingly, it is desirable to provide a surface hard coat for a synthetic resin lens having improved abrasion resistance, hot water resistance, stable tintability by a disperse dye, chemical resistance and weatherability which avoids the defect of the prior art compositions.

SUMMARY OF THE INVENTION

A surface hard coat for a synthetic resin lens including
(A) at least one organic silicon compound represented by the general formula

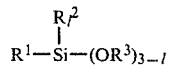

wherein $R^1$ is a hydrocarbon group having from one to six carbon atoms or an organic group including vinyl, methacryloyloxy or an epoxy radical, $R^2$ is a hydrocarbon group having from one to four carbon atoms, $R^3$ is a hydrocarbon group having from one to five carbon atoms, an alkoxy alkyl group or a hydrogen atom, and $l$ is zero or 1;
(B) colloidal silica having a particle size diameter of from about 1 to 100 millimicrons;
(C) at least one polyfunctional epoxy compound; and
(D) magnesium perchlorate, and a synthetic resin lens having a surface hard coat including (A), (B), (C) and (D) are provided.

Accordingly, it is an object of the invention to provide an improved surface hard coat for a synthetic resin lens.

It is another object of the invention to provide an improved surface hard coat for a synthetic resin lens including magnesium perchlorate as a curing catalyst.

It is a further object of the invention to provide an improved surface hard coat for a synthetic lens including an organic silicon compound, colloidal silica, a polyfunctional epoxy compound and magnesium perchlorate as a curing catalyst.

Still another object of the invention is to provide an improved synthetic resin lens having improved abrasion resistance, stable tintability by disperse dyes, weatherability, hot water resistance and chemical resistance.

Still a further object of the invention is to provide an improved synthetic resin lens having a surface hard coat including -glycidoxypropylmethydiethoxysilane, colloidal silica, diglycidylether of glycerol and magnesium perchlorate.

Still other objects and advantages of the invention will in part be obvious and will in part be apparent from the specification.

The invention accordingly comprises a composition of matter possessing the characteristics, properties, and the relation of components which will be exemplified in the composition hereinafter described, and the scope of the invention will be indicated in the claims.

DESCRIPTION OF THE PREFERRED EMBODIMENTS

A synthetic resin lens in accordance with the invention includes a surface hard coat, the surface hard coat including:

(A) at least one or a mixture of organic silicon compounds represented by the general formula:

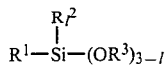

wherein $R^1$ is a hydrocarbon group having from one to six carbon atoms, an organic group containing vinyl, methacryloyloxy or an epoxy radical, $R^2$ is a hydrocarbon group having from one to four carbon atoms, $R^3$ is a hydrocarbon group or an alkoxy alkyl group having from one to five carbon atoms, or a hydron atom, and $l$ is zero or one;

(B) colloidal silica having a particle size diameter from about 1 to 100 millimicrons;

(C) at least one polyfunction epoxy compound; and (D) magnesium perchlorate as a curing catalyst.

The organic silicon compound (A) utilized includes the following compounds:
methyltrimethoxysilane
ethyltriethoxysilane
methyltriethoxysilane
phenyltrimethoxysilane
dimethyldimethoxysilane
phenylmethyldimethoxysilane
vinyltriethoxysilane
vinyltris($\beta$-methoxyethoxy)silane
vinyltriacetoxysilane
$\gamma$-glycidoxypropyltriemthoxysilane
$\gamma$-glycidoxypropylmethyldiethoxysilane
$\beta$-(3,4-epoxycyclohexyl)ethyltrimethoxysilane,
or the like.

The organic silicon compounds (A) can be used singly or jointly with each other in accordance with the invention. Additionally, it is desirable that the organic silicon compounds are hydrolyzed in an organic solvent, such as an alcohol including an acid. The organic silicon compound may be used in one of two ways. First, the organic silicon compound may be hydrolyzed and then mixed with the colloidal silica. Alternatively, the organic silicon compound may be mixed with the colloidal silica and then a mixture is hydrolyzed.

The colloidal silica (B) preferably has a particle size diameter from about 1 to 100 millimicrons. The colloidal silica is a colloidal solution wherein polymeric fine grain inorganic silicates are dispersed in a medium, such as water or an alcohol system. Such colloidal solutions are readily available commercially.

The polyfunctional epoxy compounds (C) are diglycidylethers of bifunctional alcohols, such as (poly)ethyleneglycol, (poly)propyleneglycol, neopentylglycol, catechol, resorcinol, an alkyleneglycol or a diglycidylether or a triglycidylether of a tri-functional alcohol, such as glycerol or trimethylolpropane.

Component (D) is perchloric acid magnesium which is included in the surface hard coat composition as a curing catalyst with at (A) least one of the organic silicon compound, (B), the colloidal silica and (C) the poly functional epoxy compounds. The coating composition provides a surface hard coat for a synthetic resin lens having excellent abrasion resistance, tintability by a disperse dye, chemical resistance, weatherability and long shelf life.

In general, known curing catalysts for the silanol and epoxy groups include amines, such as n-butylamine, triethylamine, guanidine, biguanide, etc. and amino acids, such as glycine and the like. However, these amine and amino acids do not result in sufficient hardness of the polymer. Metal acetylacetonates, such as aluminum acetylacetonate, chromium acetylacetonate, titanyl acetylacetonate or cobalt acetylacetonate have been used as curing catalysts, but again do not provide sufficient hardness. These catalysts, even if sufficient hardness is provided, result in poor water resistance so that the abrasion resistance is lowered when the lens is dipped in hot water. Furthermore, the shelf life of the coating compositions including such catalysts is short.

When using an organic acid metallic salt, such as sodium acetate, zinc naphthenate, zinc octylate, tin octylate, etc. and perchloric acid and the like, coating compositions having long shelf life can not be expected. Additionally, when using ammonium perchlorate as a curing catalyst there is wide variations in results in tintability by disperse dyes. Additionally, the tintability by a disperse dye changes depending on the age of the coating composition. Thus, the above-noted compounds are not practical as curing catalysts. Alternatives such as hydrochloric acid, phosphoric acid, nitric acid, paratoluenesulfonic acid may be used, but take a long time to provide curing. When using Lewis acids, such as $SnCl_4$, $AlCl_3$, $FeCl_3$, $TiCl_4$, $ZnCl_2$, $SbCl_5$, etc. the resulting coatings provide extremely poor water resistance so that abrasion resistance is lowered when the lens is dipped in water at normal temperatures.

In order to provide a surface hard coats having desired properties, several types of curing catalysts have been examined. It has been found that magnesium perchlorate is a curing catalyst providing excellent results with respect to the desired characteristics. Specifically, when using magnesium perchlorate, the useable shelf life of the coating composition is more than one month when stored at room temperature. Additionally, the resulting hard coat provides excellent abrasion resistance, hydrothermal resistance, chemical resistance, tintability by a disperse dye and weatherability.

When preparing a surface hard coat in accordance with the invention, the coating composition includes about 50 to 800 parts by weight organic silicon compound (based on a compound represented by the formula

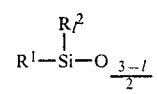

as a solid) and 50–600 parts of polyfunctional epoxy compounds per 100 parts of colloidal silica (based on solid $SiO_2$). Preferably, the coating composition includes between about 50–500 parts of organic silicon compound and 100–500 parts of polyfunctional epoxy compounds per 100 parts of colloidal silica. The magnesium perchlorate should be present in the range of about 0.01 to 5.0% based on the residual solids remaining after curing.

When preparing a coating composition in accordance with the invention, one or a mixture of solvents, such as an alcohol and ketone, a cellosolve or a carboxylic acid may be added to the composition. As necessary, application of the coating composition or the ability of the coating film to form may be improved by adding small amounts of surface active agents, anti-static agents or ultraviolet absorbers. The surface hard coat prepared in accordance with the invention may be utilized on various types of synthetic resin lenses. When such resins exhibit poor adhesion, a primer may be coated in order to improve adhesion of the surface hard coat.

The following examples are set forth in order to illustrate the surface hard coat and synthetic resin lenses prepared in accordance with the invention. However, these examples are not presented in a limiting sense.

EXAMPLE 1

1. Preparation of a Coating Composition and Coating 52 parts of 0.05N hydrochloric acid was added drop wise into a solution containing 108 parts of methyltrimethoxysilane, 212 parts of colloidal silica dispersed in isopropanol ("OSCAL-1432" having a solids content of 30 parts and manufactured by Catalysts & Chemicals Ind. Co., Ltd.) and 439 parts of isopropanol. This hydrolyzed solution was aged at 0° C. for 24 hours. Following aging, 183 parts of 1,6-hexanedioldiglycidylether ("EPOLIGHT 1600" manufactured by Kyoeisha Chemical Co., Ltd.) and 5 parts of magnesium perchlorate were added to the solution at room temperature under stirring. A few drops (about 0.02 parts) of a silicone-containing surfactant, such as a copolymer of alkylene oxide and dimethyl siloxane ("L-7604" manufactured by Nippon Unicar K.K.) were added to complete preparation of the coating composition.

A diethyleneglycolbisallylcarbonate lens (hereinafter "a CR-39 lens") which had been treated with 4% aqueous sodium hydroxide previously was cleaned and dried and dipped into the coating composition. The CR-39 lens was removed at a lifting speed of 20 cm/min. and coated with the coating composition. The coated CR-39 lens was cured by heating at 80° C. for one hour and at 130° C. for an additional hour.

2. Performance Evaluation Tests

The following five tests were performed.

(1) Abrasion resistance:

The coated lens was rubbed with #0000 gauge steelwool (manufactured by Nippon Steelwool Co., Ltd.) ten times back and forth under a load of 1 kg and the surface was examined. The rubbed lenses was classified into ten grades (A, A', B, B', C, C', D, D', E and E') wherein A corresponds to the results after rubbing glass in the same manner and E' represents the results after rubbing an acrylic resin sheet.

(2) Hot water resistance:

A coated lens was dipped into pure boiling water for one hour. The surface was examined after an abrasion resistance test as set forth in (1), above.

(3) Tintability by a disperse dye:

A dying solution was prepared by dissolving one piece of GRAY dye-assist agent produced by BPI in 950 ml pure water at 95° C. A coated lens was dipped into the prepared dying solution for 10 minutes and removed. The transmittance of monochromatic light of 510 nm was observed.

(4) Chemical resistance:

A coated lens was dipped into a 4% aqueous sodium hydroxide solution for 1 hour. The appearance of the coated lens was examined. A coated lens was dipped in a 10% hydrochloric acid solution for 24 hours and the appearance was examined.

(5) Weatherability:

Coated lenses were irradiated by a xenon lamp fade meter for 500 hours. The appearance of the lens was then examined.

Table-I reports the results of each test soon after the coated lens was prepared. Table-II reports the results of the tests of lenses coated with coating compositions prepared 30 days prior which were allowed to stand prior to the test. The tables are set forth following the Examples.

EXAMPLE 2

53 parts of 0.05N hydrochloric acid was gradually added to a solution containing 111 parts of methyltrimethoxysilane, 271 parts of colloidal silica dispersed in methanol ("OSCAL-1132" having a solids content of 30 parts manufactured by Catalysts & Chemicals Ind. Co., Ltd.) and 395 parts of isopropanol. The hydrolyzed solution was aged at 0° C. for 24 hours. After aging, 164 parts of trimethylolpropanetriglycidylether ("EPOLIGHT 100 MF" manufactured by Kyoeisha Chemical Co., Ltd.) and 5 parts magnesium perchlorate were added to the solution at room temperature and stirred. A few drops of a silicone-containing surfactant was added to the solution to provide the coating composition.

A CR-39 synthetic lens was coated in the same manner as described in connection with Example 1. The five performance tests were conducted and the results are set forth in the Table.

EXAMPLE 3

28 parts of 0.05N hydrochloric acid was added gradually to a solution containing 79 parts of dimethyldimethoxysilane, 175 parts of colloidal silica dispersed in isopropanol ("OSCAL-1432" having a solids content of 30 parts) and 51 parts of isoproponol. The hydrolyzed solution was aged at 0° C. for 24 hours. After aging, 199 parts of trimethylolpropanetriglycidylether ("EPOLIGHT 100 MF") and 7 grams of magnesium perchlorate were added and stirred. A few drops of a silicon containing surfactant was added to the solution to provide the coating composition.

A CR-39 lens was coated as described in Example 1. The five performance tests were conducted shortly after coating and the results are set forth in the Tables.

EXAMPLE 4

57 parts of 0.05N hydrochloric acid was added gradually to a solution containing 207 parts of γ-glycidoxypropyltrimethoxysilane, 263 parts of colloidal silica dispersed in water ("Snowtex C" having a solids content of 20% manufactured by Nissan Chemical Industries, Ltd.) and 366 parts of methylcellosolve. The hydrolyzed solution was aged at 0° C. for 24 hours. After aging, 101 parts of 1,6-hexanedioldiglycidylether ("EOPLIGHT 1600" manufactured by Kyoeisha Chemical Co., Ltd.) and 6 parts of magnesium perchlorate were added thereto at room temperature and stirred. A few drops of a silicon containing surfactant was added to the solution to provide the coating composition.

A synthetic resin lens was coated and the performance test described in Example 1 were conducted and the results are set forth in the Tables.

EXAMPLE 5

68 parts of 0.05N hydrochloric acid was added drop wise to a solution containing 249 parts of γ-glycidoxypropyltrimethoxysilane, 126 parts of colloidal silica ("Methanol Silicasol" having a solids content of 30% manufactured by Nissan Chemical Industries Ltd.) and 464 parts of cellosorb. The hydrolyzed solution was permitted to age at 0° C. for 24 hours. After aging, 86 parts of glyceroldiglycidylether ("Denacol EX 313" manufactured by Nagase & Company Ltd.) and 7 parts of magnesium perchlorate was added to the solution at room temperature and stirred. A few drops of a silicon containing surfactant were added to the solution to provide the coating composition.

A synthetic resin lens was coated in the manner described in Example 1. The performance tests were conducted and the results are set forth in the Tables.

EXAMPLE 6

60 parts of 0.05N hydrochloric acid was added gradually to a solution containing 219 parts of γ-glycidoxypropyltrimethoxysilane, 111 parts of colloidal silica dispersed in isopropanol ("OSCAL-1432" having a solids content of 30%) and 491 parts of isoproponol. The hydrolyzed solution was permitted to age at 0° C. for 24 hours. After aging, 112 parts of propyleneglycoldiglycidylether ("Denacol EX 911" manufactured by Nagase & Company Ltd.) and 7 parts of magnesium perchlorate were added and stirred. A few drops of silicon containing surfactant was added to the solution to provide the coating composition.

A synthetic resin lens was coated in accordance with the procedures of Example 1. The performance test were conducted and the results are set forth in the Tables.

EXAMPLE 7

30 parts of 0.05N hydrochloric acid was added gradually to a solution containing 174 parts of γ-glycidoxypropylmethyldiethoxysilane, 351 parts of colloidal silica dispersed in water ("Cataloid SN" having a solids content of 20% manufactured by Catalysts & Chemicals Ind. Co., Ltd.) and 331 parts of methylcellosorb. The hydrolyzed solution was aged at 0° C. for 24 hours. After aging, 108 parts of propyleneglycoldiglycidylether ("Denacol EX 911" manufactured by Nagase & Company Ltd.) and 6 parts of magnesium perchlorate were added thereto and stirred. A few drops of a silicon containing surfactant was added to the solution to provide the coating composition.

The synthetic resin lens was coated in accordance with Example 1. The performance tests were performed and the results are set forth in the Tables.

EXAMPLE 8

35 parts of 0.05N hydrochloric acid was added gradually to a solution containing 133 parts of β-(3,4-epoxycyclohexyl)ethyltrimethoxysilane, 215 parts colloidal silica ("Methanol Silicasol" having a solids content of 30%) and 470 parts of isopropanol. The hydrolyzed solution was aged at 0° C. for 24 hours. After aging, 140 parts of glyceroltriglycidilether ("Denacol EX 314" manufactured by Nagase & Company Ltd.) and 7 parts of magnesium perchlorate were added thereto and stirred. A few drops of a silicon containing surfactant was added to the solution to provide the coating composition.

A synthetic resin lens was coated in accordance with the procedures set forth in Example 1. The performance tests were conducted and the results are set forth in the following Tables.

EXAMPLE 9

A polycarbonate lens was coated with a KP80 polysilicon polymer primer manufactured by Shinetsu Kagaku Kogyo Co., Ltd. with a spinner and dried at 100° C. for 30 minutes. The primed polycarbonate lens was dipped into a coating composition prepared in accordance with Example 4 and removed at a lifting speed of 20 cm/min. After coating the polycarbonate lens was cured by heating at 80° C. for 1 hour and at 130° C. for an additional hour.

COMPARATIVE EXAMPLE 1

10 parts of 0.05N hydrochloric acid was added to 71 parts of γ-glycidoxypropylmethyldiethoxysilane with stirring. The hydrolyzed solution was stirred for 1 hour and aged at room temperature for 24 hours. After aging, 167 parts of colloidal silica ("Methanol Silicasol" having a solids content of 30%), 4.5 parts of aluminum acetylacetonate, 0.1 parts of a silicon containing surfactant and 12.4 parts of phenylcellosolve were added to the solution to provide the coating composition.

A CR-39 synthetic resin lens was coated with the coating conditions set forth in Example 1. The performance tests were conducted and the results are set forth in the following Tables.

COMPARATIVE EXAMPLE 2

98.8 parts of γ-glycidoxypropyltrimethoxysilane and 28.4 parts of dimethyldimethoxysilane were dissolved in 76.3 parts of isopropyl alcohol and 46.6 parts of 0.1N hydrochloric acid was gradually added thereto. The hydrolyzed solution was aged at room temperature for 24 hours. After aging, 88.4 parts of ethylcellosolve, 0.42 parts of ammonium perchlorate and a silicon containing surfactant were added to 240 parts of the hydrolyzed solution to yield the coating composition.

A synthetic resin lens was coated in accordance with the conditions set forth in Example 1. The coated lens was subjected to the performance tests and the results are reported in the following Tables.

COMPARATIVE EXAMPLE 3

A catalytic solution containing 5 parts of chloroform, 5 parts of acetone and 1 part of perchloric acid was formed and added to 100 parts of γ-glycidoxypropyltrimethoxysilane at 0° C. A CR-39 lens was dipped into the prepared coating composition and removed at a lifting speed of 20 cm/min. The coated CR-39 lens was cured by drying at 25° C. for 16 hours. The coated lens was subjected to the performance tests of Example 1 and the results are set forth in the following Tables.

COMPARATIVE EXAMPLE 4

The coating composition described in Example 7 was prepared except that aluminum acetylacetonate was substituted for the magnesium perchlorate. All other components and conditions were the same as described in Example 7. The coated lens was subjected to the performance tests of Example 1 and the results are set forth in the following Tables.

COMPARATIVE EXAMPLE 5

The coating composition of Example 4 was prepared except that ammonium perchlorate was utilized in place of the magnesium perchlorate. All other components and conditions remain the same as set forth in Example 4. The coated lens was subjected to the comparative example and the results are set forth in the following Tables.

COMPARATIVE EXAMPLE 6

An uncoated CR-39 lens was subjected to the performance tests of Example 1 and the results are set forth for purposes of comparison in the following Tables.

As set forth above, the principal object of the invention is to provide a synthetic resin lens which will resist scratching or scarring and provide improved abrasion resistance, chemical resistance and avoid the disadvantages commonly associated with synthetic resin lenses, namely poor tintability by disperse dye and hot water resistance. Particularly, the lenses prepared in accordance with the invention may be dyed more quickly than conventional hard coated lenses. Thus, the coating compositions prepared in accordance with the invention offer excellent tintability by disperse dyes. Additionally, the magnesium perchlorate utilized as the curing catalyst increases the shelf life of the coating composition. As a result of the invention, it is now possible

TABLE I (Coated Soon After Preparation)

| | Abrasion resistance | Heat-water resistance | Tintability by disperse-dye (transmittance of 510 nm) | Chemical resistance | | Weatherability |
| --- | --- | --- | --- | --- | --- | --- |
| | | | | 4% NaOH | 10% HCl | |
| Embodiment 1 | B' | B' | 38% | pass | pass | pass |
| Embodiment 2 | B | B' | 52 | " | " | " |
| Embodiment 3 | B' | C | 37 | " | " | " |
| Embodiment 4 | A' | B | 56 | " | " | " |
| Embodiment 5 | B | B | 41 | " | " | " |
| Embodiment 6 | B | B | 40 | " | " | " |
| Embodiment 7 | B' | B' | 36 | " | " | " |
| Embodiment 8 | B' | C | 32 | " | " | " |
| Embodiment 9 | B' | B' | 42 | " | " | " |
| Comparitive embodiment 1 | C | E | 75 | " | " | " |
| Comparitive embodiment 2 | B | C | 78 | The coating dissolved partially. | " | " |
| Comparitive embodiment 3 | B' | C | 90 | pass | " | " |
| Comparitive embodiment 4 | C | E' | 62 | " | " | " |
| Comparitive embodiment 5 | B' | C' | 65 | " | " | " |
| CR 39 | D' | D' | 22 | Dry spot appeared on the surface. | " | " |

TABLE II (Coated 30 Days After Preparation)

| | Abrasion resistance | Heat-water resistance | Tintability by disperse-dye (transmittance of 510 nm) | Chemical resistance | | Weatherability |
| --- | --- | --- | --- | --- | --- | --- |
| | | | | 4% NaOH | 10% HCl | |
| Embodiment 1 | B' | B' | 40% | pass | pass | pass |
| Embodiment 2 | B' | B' | 47 | " | " | " |
| Embodiment 3 | B' | C | 36 | " | " | " |
| Embodiment 4 | A' | B | 58 | " | " | " |
| Embodiment 5 | B | B' | 41 | " | " | " |
| Embodiment 6 | B | B | 42 | " | " | " |
| Embodiment 7 | B | B' | 43 | " | " | " |
| Embodiment 8 | B' | B' | 34 | " | " | " |
| Embodiment 9 | B' | B' | 43 | " | " | " |
| Comparitive embodiment 1 | E | E' | 17 | Dry spot appeared on the surface. | " | " |
| Comparitive embodiment 2 | A' | B' | 85 | The coating dissolved partially. | " | " |
| Comparitive embodiment 3 | E | E' | 83 | pass | " | " |
| Comparitive embodiment 4 | E | E' | 21 | " | " | " |
| Comparitive embodiment 5 | A' | B' | 80 | " | " | " |
| CR 39 | D' | D' | 22 | Dry spot appeared on the surface. | " | " | to provide a synthetic resin lens having stable tintability by a disperse dye and to provide such desirable lenses at reduced costs.

It will thus be seen that the objects set forth above, among those made apparent from the preceding description, are efficiently attained and, since certain changes may be made in the above composition of matter without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A synthetic resin lens surface hard coating composition, comprising:

about 50–800 parts by weight of at least one organic silicon compound represented by the general formula:

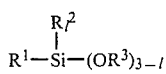

wherein $R^1$ is a hydrocarbon having from one to six carbon atoms, or an organic group containing a vinyl, methacryloyloxy or an epoxy radical, $R^2$ is a hydrocarbon group having from one to four carbon atoms, $R^3$ is a hydrocarbon group or an alkoxy alkyl group having from one to five carbon atoms, or a hydrogen atom, and $l$ is 0 or 1;

100 parts by weight of colloidal silica (based on solid $SiO_2$), said silica having a particle size diameter of from about 1 to 100 millimicrons;

about 50–600 percent by weight of at least one polyfunctional epoxy compound; and about 0.01 to 5.0 percent by weight magnesium perchlorate based on the residual solids in the composition after curing.

2. The synthetic resin lens surface hard coating composition of claim 1, including about 50–500 parts by weight of the organic silicon compound, 100 parts of colloidal silica (based on solid $SiO_2$) and 100–500 parts of the polyfunctional epoxy compounds.

3. The synthetic resin lens surface hard coating composition of claim 1, wherein the organic silicon compound is at least one compound selected from the group consisting of methyltrimethoxysilane, ethyltriethoxysilane, methyltriethoxysilane, phenyltrimethoxysilane, dimethyldimethoxysilane, phenylmethyldimethoxysilane, vinyltriethoxysilane, vinyltris($\beta$-methoxyethoxy)-silane, vinyltriacetoxysilane, $\gamma$-glycidoxypropyltrimethoxysilane, $\gamma$-glycidoxypropylmethyldiethoxysilane and $\beta$-(3,4-epoxycyclohexyl)ethyltrimethoxysilane.

4. The synthetic resin lens surface hard coating composition of claim 1, wherein the polyfunctional epoxy compound is a compound selected from the group consisting of a diglycidylether of a bifunctional alcohol or a diglycidylether or triglycidylether of a trifunctional alcohol.

5. The synthetic resin lens surface hard coating composition of claim 1, wherein the organic silicon compound is $\gamma$-glycidoxypropyltrimethoxysilane.

6. The synthetic resin lens surface hard coating composition of claim 1, wherein the polyfunctional epoxy compound is diglycidylether of glycerol.

7. The synthetic resin lens surface hard coating composition of claim 1, wherein the polyfunctional epoxy compounds selected from the group consisting of 1,6-hexanedioldiglycidylether, trimethylolpropanetriglycidylether, glyceroldiglycidylether.

8. The synthetic resin lens surface hard coating composition of claim 1 comprising $\gamma$-glycidoxypropyltrimethoxysilane, colloidal silica having a particle size diameter of about 1 to 100 millimicrons, diglycidylether of glycerol and magnesium perchlorate.

9. A synthetic resin lens having a surface hard coating, comprising:

a synthetic resin lens body;

a surface hard coat deposited on the lens body, the surface hard coat formed by curing a coating including:

about 50–800 parts by weight of at least one organic silicon compound represented by the general formula:

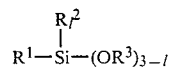

wherein $R^1$ is a hydrocarbon having from one to six carbon atoms, or an organic group containing a vinyl, methacryloyloxy or an epoxy radical, $R^2$ is a hydrocarbon group having from one to four carbon atoms, $R^3$ is a hydrocarbon group or an alkoxy alkyl group having from one to five carbon atoms, or a hydrogen atom, and $l$ is 0 or 1;

100 parts by weight of colloidal silica based on solid $SiO_2$, having a particle size diameter of from about 1 to 100 millimicrons;

about 50–600 parts by weight of at least one polyfunctional epoxy compound; and about 0.01 to 5.0 percent by weight magnesium perchlorate based on the residual solids in the composition after curing.

10. The synthetic resin lens of claim 9, wherein the lens body is a diethyleneglycolbisallylcarbonate synthetic resin lens.

11. A synthetic resin lens having a surface hard coat, comprising:

a diethyleneglycolbisallylcarbonate synthetic resin lens body; and a surface hard coat deposited on the lens body by curing a coating composition, including about 50–800 parts by weight $\gamma$-glycidoxypropyltrimethoxysilane, 100 parts colloidal silica based on solid $SiO_2$ having a particle size diameter of about 1 to 100 millimicrons, about 50–600 parts by weight diglycidylether of glycerol and about 0.01 to 5.0 percent by weight magnesium perchlorate based on the residual solids in the composition after curing.

* * * * *